United States Patent [19]

Okamoto

[11] Patent Number: 4,886,291

[45] Date of Patent: Dec. 12, 1989

[54] FAIL-SAFE SYSTEM FOR AUTOMOTIVE SUSPENSION CONTROL SYSTEM

[75] Inventor: Mitsuyuki Okamoto, Isehara, Japan

[73] Assignee: Nissan Motor Company, Limited, Yokohama, Japan

[21] Appl. No.: 117,411

[22] Filed: Nov. 2, 1987

Related U.S. Application Data

[63] Continuation of Ser. No. 740,988, Jun. 4, 1985, abandoned.

[30] Foreign Application Priority Data

Jun. 6, 1984 [JP]  Japan ................. 59-115740

[51] Int. Cl.$^4$ .............................................. B60G 17/00
[52] U.S. Cl. ................................ 280/707; 364/424.05
[58] Field of Search ............... 280/707, 702, 703, 709, 280/711, 74, 689, DIG. 1, 6 R; 180/299, 319; 364/424, 424.05

[56] References Cited

U.S. PATENT DOCUMENTS

| | | | |
|---|---|---|---|
| 3,029,089 | 4/1962 | Nashman | 280/DIG. 1 |
| 3,945,664 | 3/1976 | Hiruma | 280/703 |
| 4,105,216 | 8/1978 | Graham et al. | 280/6 R |
| 4,327,936 | 5/1982 | Sekiguchi | 280/711 |
| 4,349,077 | 9/1982 | Sekiguchi | 280/707 |
| 4,363,092 | 12/1982 | Abo et al. | 364/200 |
| 4,526,401 | 7/1985 | Kakizaki et al. | |
| 4,555,126 | 11/1985 | Ishimitsu et al. | 280/707 |

FOREIGN PATENT DOCUMENTS

| | | |
|---|---|---|
| 0135902 | 3/1985 | European Pat. Off. . |
| 56-42739 | 4/1981 | Japan . |
| 153267 | 11/1981 | Japan . |
| 153268 | 11/1981 | Japan . |
| 57-84375 | 5/1982 | Japan . |
| 57-93271 | 6/1982 | Japan . |
| 182544 | 11/1982 | Japan . |
| 58-30814 | 2/1983 | Japan . |
| 58-30815 | 2/1983 | Japan . |
| 042468 | 3/1984 | Japan . |
| 59-73313 | 4/1984 | Japan . |
| 137641 | 8/1984 | Japan ................. 280/707 |
| 61-38481 | 2/1986 | Japan . |
| 199510 | 9/1987 | Japan ................. 280/707 |
| 2006131 | 5/1979 | United Kingdom ........... 280/689 |
| 2090495 | 7/1982 | United Kingdom . |

OTHER PUBLICATIONS

Society of Automotive Engineers Technical Paper No. 840258, "Chassis Electronic Control Systems for the Mitsubishi 1984 Galant", 3/84.

*Primary Examiner*—David M. Mitchell
*Assistant Examiner*—Karin Tyson
*Attorney, Agent, or Firm*—Foley & Lardner, Schwartz, Jeffery, Schwaab, Mack, Blumenthal & Evans

[57] ABSTRACT

A fail-safe system for an automotive suspension control system monitors inputs from one or more sensors monitoring vehicle driving conditions and producing sensor signals indicative of suspension control parameters, and operation of a controller. The fail-safe system performs fail-safe operation by which over-steering characteristics of the vehicle are prevented when malfunction of any of the sensors or of the controller is detected. In order to ensure prevention over-steering, the fail-safe system stiffens the suspension for driving wheels so that the damping characteristics at the driving wheels are stiffer than at the driven wheel.

39 Claims, 10 Drawing Sheets

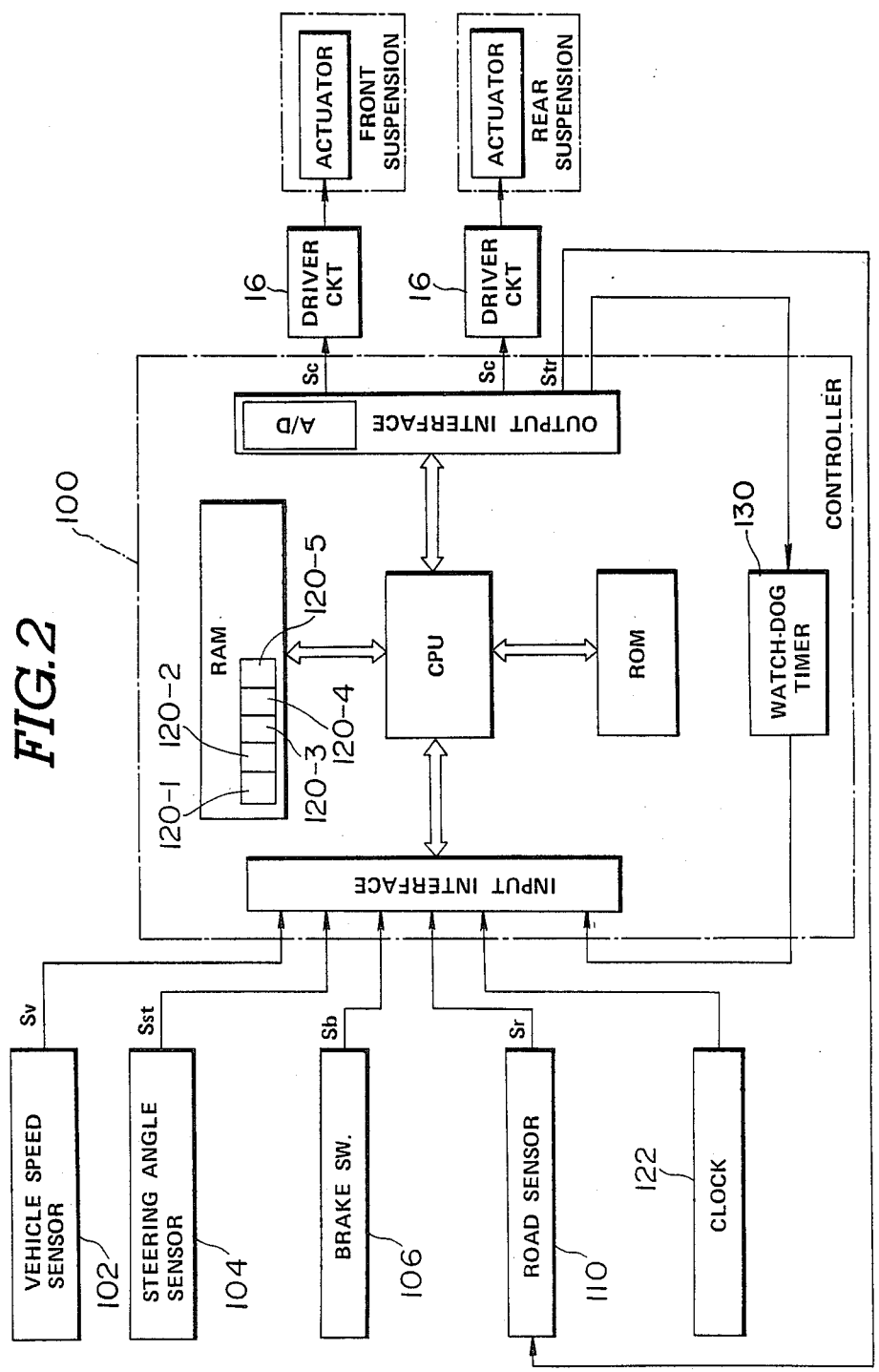

FAIL-SAFE SYSTEM FOR AUTOMOTIVE SUSPENSION CONTROL SYSTEM

This application is a continuation of application Ser. No. 740,988, filed June 4, 1985 now abandoned.

BACKGROUND OF THE INVENTION

The present invention generally relates to an electronic control system for an automotive suspension for adjusting damping characteristics depending upon vehicle driving conditions. More specifically, the invention relates to a fail-safe system for the suspension control system for carrying out a predetermined fail-safe operation when a sensor, which monitors vehicle driving conditions, and/or the controller fail.

In the recent years, various suspension control systems for adjusting damping characteristics of suspension systems have been proposed and developed. For example, Japanese Patent First Publications (Tokkai) Showa 58-30814, 58-30815 and 59-73313 disclose suspension control systems which adjust damping characteristics of the vehicular suspension generally based on a vehicle speed, steering angular variation, vehicle height and brake conditions. Each of the disclosed control systems employs a microprocessor serving as controller. The controller processes the aforementioned control parameters to derive a control signal for controlling damping characteristics.

The suspension system includes shock absorbers or the like with variable damping characteristics for varying the damping response to shocks applied to the vehicle body and the vehicle wheels. The damping characteristics of such shock absorbers are controlled by the control signal from the controller for adapting the damping characteristics of the suspension system to vehicle driving conditions.

In this arrangement, the suspension control system successfully provides both driving stability and riding comfort.

In such suspension control systems, failure of a sensor and/or the controller greatly hinders adjustment of the damping characteristics in accordance with the vehicle driving conditions. This tends to degrade drivability of the vehicle and, in the worst case, may dangerously enforce steering characteristics not suited to current vehicle driving conditions. In particular, in the case of suspension control systems of the type which control front and rear suspension systems independently, if the suspension is erroneously controlled to provide different damping characteristics for front and rear suspension systems, the vehicle will tend to over-steer or under-steer, which will degrade the drivability of the vehicle. Furthermore, over-steering may even be dangerous when cornering.

SUMMARY OF THE INVENTION

Therefore, it is an object of the present invention to provide a fail-safe system for a suspension control system which can prevent the vehicle from over-steering even when one or more components of the system malfunctions.

In order to accomplish the above-mentioned and other objects, a fail-safe system for an automotive suspension control system, according to the present invention, monitors inputs from one or more sensors monitoring vehicle driving conditions and producing sensor signals indicative of suspension control parameters, as well as monitoring operation of a controller. The fail-safe system performs a fail-safe operation to ensure that the vehicle will not over-steer.

In order to prevent over-steering, the fail-safe system hardens the suspension of the driving wheels so that the damping characteristics of the driving wheels are stiffer than that of the driven wheels.

In cases where the suspension control system is applied to a front-wheel-drive vehicle, the fail-safe system stiffens the front suspension relative to the rear suspension so as to adjust the steering characteristics of the vehicle toward under-steer characteristics which are rather preferable to over-steer characteristics.

According to one aspect of the invention, a suspension control system comprises front and rear vehicle suspension systems, each being operable to assume various mode positions producing different damping characteristics, a sensor for detecting preselected vehicle driving conditions and producing a sensor signal indicative thereof, and a controller responsive to the sensor signal for deriving independent front and rear suspension control signals indicative of one of the mode positions and outputting the control signals to the front and rear suspension systems to order the latter to the indicated mode position, the controller checking its own operation and that of the sensor for malfunction and performing a fail-safe operation in which one of the front and rear suspension systems is ordered into a stiffer-damping-characteristics mode position relative to the other in order to prevent the vehicle suspension from exhibitting over-steering characteristics when malfunction of one of the controller and the sensor is detected.

BRIEF DESCRIPTION OF THE DRAWINGS

The present invention will be understood more fully from the detailed description given herebelow and from the accompanying drawings of the preferred embodiment of the present invention, which, however, should not be taken to limit the invention to the specific embodiment, but are for explanation and understanding only.

In the drawings:

FIG. 2 is a block diagram of the preferred embodiment of the suspension control system according to the invention;

DESCRIPTION OF THE PREFERRED EMBODIMENT

Figure 1:
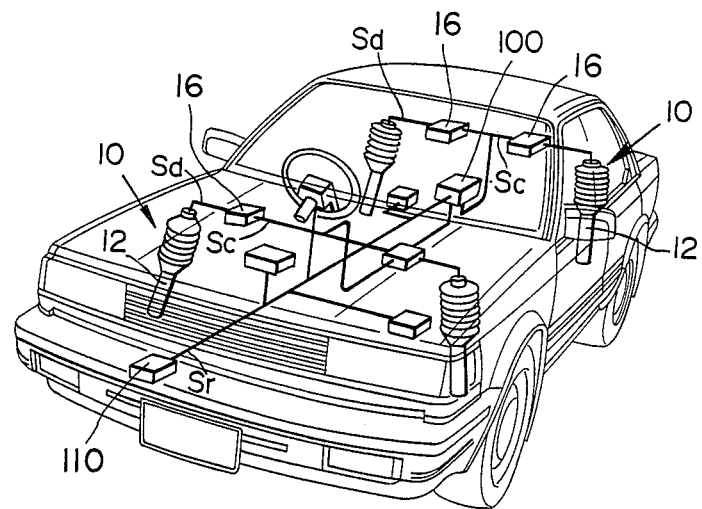
FIG. 1 is a diagram of an automotive vehicle with a typical vehicular suspension and the preferred embodiment of a suspension control system according to the invention.

Referring now to the drawings, particularly FIGS. 1 and 2, the vehicle illustrated has a strut-type suspension system for the front and rear wheels. Each of the front and rear wheels 10 supports some of the weight of a vehicle body through suspension struts 12. In the shown embodiment, the front and rear suspension struts 12 have shock absorbers 14, which have shock-absorbing characteristics variable between HIGH and LOW levels.

Throughout the specification, the word "shock absorbing characteristics" should be understood as the ability to produce a shock-absorbing or damping force in response to relative displacement of the vehicle body, i.e. the sprung mass, and the vehicle wheel axle, i.e. the unsprung mass. In addition, "HIGH damping force" refers to the stronger of the levels of damping force or spring force produced by the shock absorber 14 and "LOW damping force" refers to the weaker level of damping or spring force produced in response to an equally strong shock.

The shock absorbers 14 thus operate in either of two modes corresponding to the HIGH and LOW shock-absorbing characteristics. The shock absorbers 14 are connected to a controller 100 which selects the operation mode of the shock absorbers 14 on the basis of preselected parameters indicative of vehicle driving conditions.

In the preferred embodiment, the controller 100 detects vehicle driving conditions on the basis of vehicle speed V, steering angular variation S, braking condition B and road surface condition R. In order to derive the vehicle driving condition, the controller 100 is connected to a vehicle speed sensor 102, a steering angle sensor 104, a brake switch 106 and a road sensor 110.

The vehicle speed sensor 102 is adapted to produce a vehicle speed indicative signal Sv indicative of the vehicle speed V. The controller 100 controls the damping characteristics of the front and rear suspensions depending upon the vehicle speed V. In general, the controller 100 orders the front and rear suspensions to SOFT mode while the vehicle speed is lower than a predetermined vehicle speed threshold Vref. When the vehicle speed V exceeds the vehicle speed threshold Vref, the controller 100 operates the front and rear suspensions to MEDIUM mode.

The steering angle sensor 102 generally monitors steering behaviour and produces a steering angle indicative signal SST indicative, of steering direction and steering angular variation. The controller 100 anticipates vehicle rolling magnitude on the basis of the steering angle indicative signal. In general, the controller orders the front and rear suspension to HARD mode when the magnitude of vehicular roll derived from the steering angle-indicative signal value and the vehicle speed-indicative signal value is greater than a predetermined rolling threshold value in order to ensure roll-stability. On the other hand, the controller 100 selects SOFT mode when the magnitude of vehicular roll is less than the predetermined threshold value to ensure riding comfort during normal vehicle operation.

The brake switch 106 closes in response to application of vehicular brakes and outputs a braking state indicative signal Sb. The controller 100 orders the front and rear suspensions into HARD mode in response to the braking state indicative signal Sb in order to reduce nose-dive during deceleration.

The road sensor 110 monitors the smoothness of the road surface and produces a road condition indicative signal Sr. For example, the road sensors recited in SAE Technical Paper Series Nos. 630750 and 800520, respectively published in October, 1968 and February, 1980 may be employed in the preferred embodiment of the suspension control system. However, in the preferred embodiment, the road sensor 110 illustrated in FIGS. 7 and 8, which will be described later, is employed. The controller 100 controls the suspension in accordance with road surface conditions.

Figure 3:
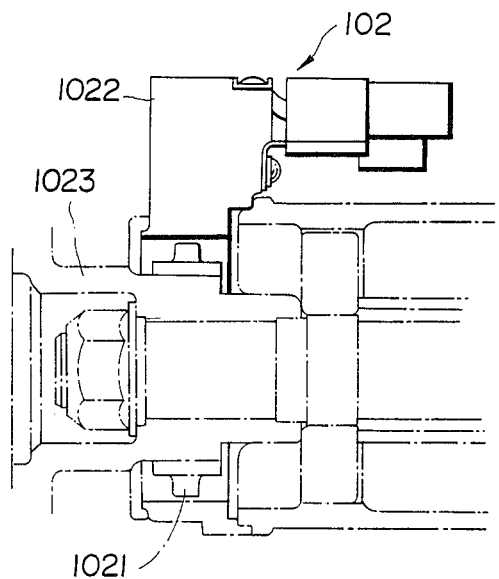
FIG. 3 is a side elevation of a vehicle speed sensor employed in the preferred embodiment of the suspension control system of FIG. 2.
Figure 4:
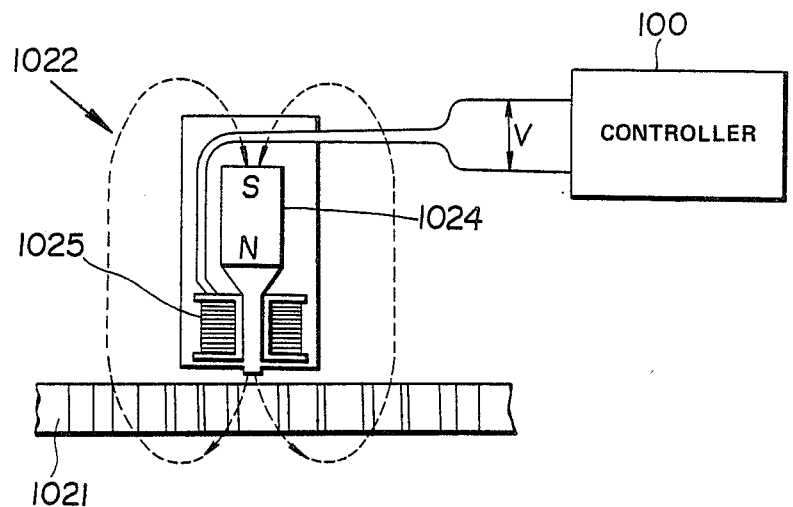
FIG. 4 is a diagram illustrating the operation of the vehicle speed sensor of FIG. 3.

FIGS. 3 and 4 show an example of the vehicle speed sensor 102. In order to monitor the rotational speed of the rear wheels, the vehicle speed sensor 102 is installed opposite a drive pinion shaft or a propeller shaft near a differential gear box. The vehicle speed sensor 102 comprises a sensor rotor 1021 and a sensor assembly 1022. The sensor rotor 1021 is associated with a companion flange 1023 which is, in turn, rigidly secured to the propeller shaft for rotation therewith. Thus, the sensor rotor 1021 rotates with the propeller shaft. The sensor rotor 1021 is formed with a plurality of radially symmetrically arranged peripheral knotches. The sensor assembly 1022 is fixed to a final drive housing or the differential gear box. The sensor assembly 1022 is a kind of proximity switch sensitive to the passage of knotches. The sensor assembly 1022 outputs an alternating-current vehicle speed sensor signal having a frequency proportional to or corresponding to the average rotational speed of the rear wheels. The electromagnetic coil 1025 of the sensor assembly 1022 is connected for output of the AC sensor signal to the controller 100.

Figure 6:
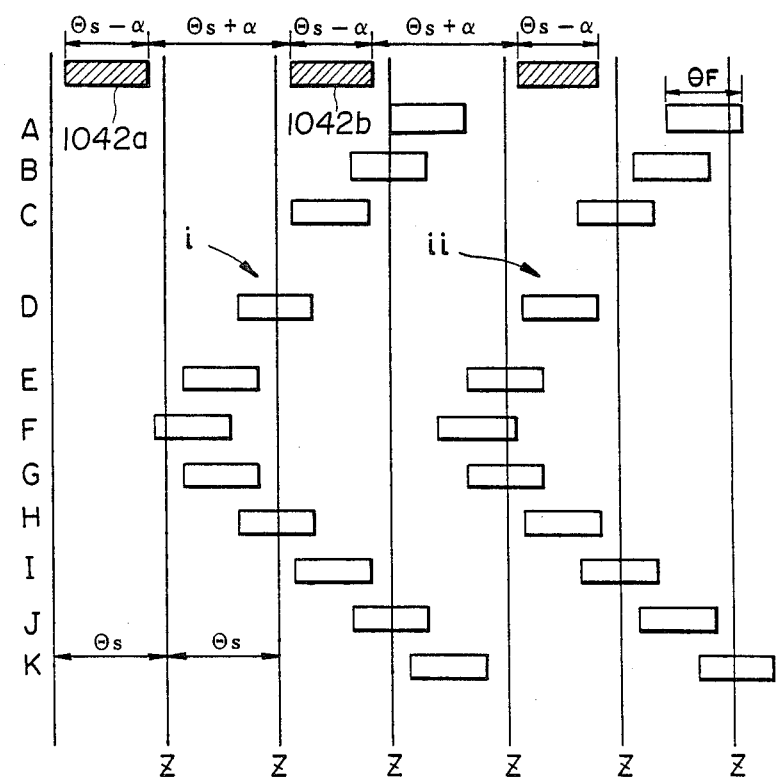
FIG. 6 is a diagram illustrating how the steering angle value is derived from the output of the steering angle sensor.
Figure 5:
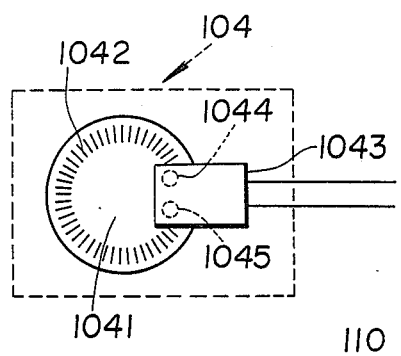
FIG. 5 shows the crucial component of the steering angle sensor employed in the preferred embodiment of the suspension control system of FIG. 2.

FIGS. 5 and 6 show an example of the steering angle sensor 104. As shown in FIG. 5 the steering angle sensor 104 includes a disc 1041 fixedly mounted on a steering shaft (not shown) near the steering wheel (not shown) for rotation therewith. The disc 1041 is formed with a plurality of slits 1042 arranged radially symmetrically about its circumference. Each slit 1042 covers a sector $\theta s - \alpha$ around the circumference and has an edge-to-edge separation from adjacent slits of $\theta s + \alpha$, as shown in FIG. 6. A photo-interrupter module 1043 scans the disk and has a pair of interrupters 1044 and 1045. Each interrupter 1044 and 1045 emits a light beam through a corresponding slit 1042a and 1042b which has a span θF on the same order of magnitude as θs and receives the light beam passing through the corresponding slit 1042a and 1042b and through one of the slits of the disc 1041. The photo interrupter module 1043 produces, two parallel pulse signals (i) and (ii) as shown in FIG. 6. The pulse signals have a phase difference of θs/2. The rotational direction of the vehicular steering determines which of the two parallel signals (i) and (ii) leads in phase.

It should be noted that the phase separation between the photo interrupter 1044 and 1045 must agree with the following expression in order to yield an angular resolution of θs/2:

$$n \times \theta s + 5 \times \theta s/2; n = 0, 1, ....$$

In practice, the steering angle sensor 104 outputs a steering angle signal pulse after every 1° of steering angle variation.

This steering angle sensor has been disclosed in the co-pending U. S. Pat. Application Ser. No. 580,174, filed on Feb. 18, 1984, U.S. Pat. No. 4,581,607 which corresponds to the co-pending European Patent Application No. 84101645.4, filed on Feb. 18, 1984. The contents of the above-identified U.S. Patent are hereby incorporated by reference for the sake of disclosure.

Figure 7:
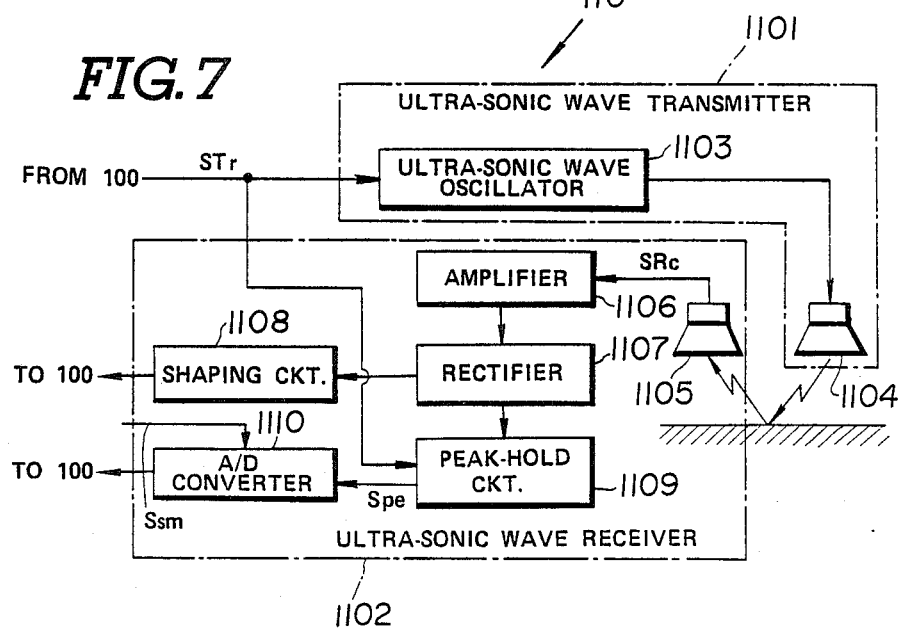
FIG. 7 is a block diagram of a road sensor employed in the preferred embodiment of suspension control system according to the invention, of FIG. 2.

As shown in FIG. 1, the road Sensor 110 is mounted adjacent the front end of the vehicle body and adapted to detect the smoothness of the road surface in the forward area of the vehicle. FIG. 7 shows the road sensor 110 applied in the preferred embodiment of the suspension control system according to the invention. The road sensor 110 generally comprises an ultra-sonic sensor which comprises an ultra-sonic transmitter 1101 and a reflected ultra-sonic wave receiver 1102. The transmitter 1101 is connected with the controller 100 to periodically receive a trigger signal STr. The transmitter 1101 includes an ultra-sonic oscillator 1103 and an ultra-sonic wave transmitting section 1104. The ultra-sonic oscillator 1103 is responsive to the trigger signal STr from the controller 100, which is issued periodically or intermittently, to transmit or discharge ultra-sonic waves through the transmitting section 1104 toward the road surface.

The ultra-sonic waves reflected from the road surface are received by a receiver section 1105 of the receiver 1102. The receiver section 1105 produces a receiver signal SRc having a value varying in accordance with the amplitude of the received ultra-sonic wave. The receiver section 1105 is connected to an amplifier 1106 to supply the receiver signal SRc to the latter. The receiver signal SRc is amplified by the amplifier 1106 and transmitter to a rectifier 1107. The rectifier 1107 is connected to the controller 100 through a shaping circuit 1108. The rectifier 1107 is also connected to a peak-hold circuit 1109 which holds the peak value of the receiver signal. The peak-hold circuit 1109 produces an analog peak-value indicative signal SPe having a value proportional to the held peak value. The peak-hold circuit 1109 outputs the peak-value indicative signal to the controller 100 via an analog-to-digital converter 1110. The analog-to-digital converter 1110 outputs a binary signal indicative of the peak-value indicative signal value to the controller.

The peak-hold circuit 1109 is also connected to the controller 100 to receive the trigger signal STr. The peak-hold circuit 1109 is responsive to the trigger signal from the controller to clear the currently held value.

Figure 8:
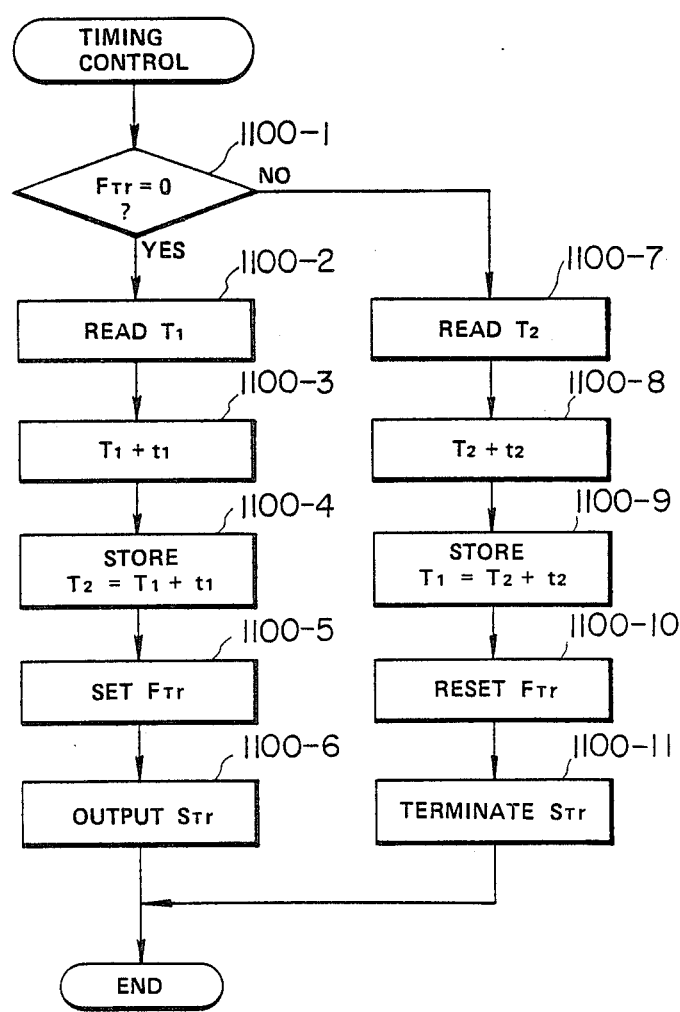
FIG. 8 is a flowchart of a road sensor timing control program for determining operation timing of the road sensor.

FIG. 8 shows a timing control program to be executed by the controller 100 for controlling the trigger timing of the ultra-sonic sensor.

At the initial stage of execution of the timing control program, a trigger signal output-indicative flag FTr in a corresponding memory block of RAM, serving as a flag register, is checked at a step 1100-1. The trigger signal output-indicative flag FTr is set when the trigger signal is output through the interface 1001 to the transmitter 1101 and is reset when the trigger signal is not being output.

If the trigger signal-indicative flag FTr is set when checked at the step 1100-1, then the timer value T1 of the timer provided in the controller 100 is latched at a step 1100-2. The timer continuously counts clock pulses from the clock generator. A trigger signal On-time indicative timer value t1 is added to the latched timer value T1 at a Step 1100-3. The resultant value (T1 + t1), which serves as a trigger signal OFF-time value, is transferred to and stored in a T2-register of the controller, at a step 2200-4. Then the flag FTr is set at a step 1100-5. A HIGH-level output is applied to the output interface as trigger signal STr at a step 1100-6.

During the period starting from the time T1, the potential at the output interface is held HIGH to continue application of the trigger signal STr to the transmitter. The timer continues counting the clock pulses and produces a T1-timer signal after that period which serves as a trigger signal for the timing control program.

In response to the T1-timer signal at time T2 marking the end of the period, the timing control program is executed again. Since the trigger signal-indicative flag FTr was set at the step 1100-5 in the previous cycle of the program execution, the answer at the step 1100-1 is "NO". Thus, control passes to a step 1100-7 in which the timer value T2 of the second timer is accessed. Similarly to the first-mentioned timer, the timer continuously counts clock pulses from the clock generator. An OFF-interval indicative time date t2 is added to the latched timer value T2 at a step 1100-8. The time data t2 has a value corresponding to a predetermined interval between successive trigger signals. The resultant timer value (T2 + t2) is stored in the T1-timer of the controller at a step 1100-9. Then, the flag FTr is reset at a step 1100-10. After the step 1100-10, the output level at the output interface drops to LOW to terminate transmission of the trigger signal to the transmitter, at a step 1100-11.

The detailed structure and operation of the preferred embodiment of the ultra-sonic sensor has been disclosed in the co-pending U.S. Pat. Application Ser. No. 650,705, filed Sept. 14, 1984 U.S. Pat. No. 4,630,226. The contents of the above-identified co-pending U.S. Patent are hereby incorporated by reference for the sake of disclosure.

It should be appreciated that such a road sensor for detecting road surface conditions has been disclosed in Japanese Patent First Publication Nos. 56-153267 and 56-153268, both published on Nov. 27, 1981. The contents of the above-identified Japanese Patent First Publications are hereby incorporated by reference for the sake of disclosure. In addition, although a road sensor detecting road conditions by means of ultrasonic wave has been specifically disclosed in the preferred embodiment of the invention, the sensor need not be an ultrasonic-based sensor but can use light, laser beams and so forth. For example. U.S. Pat. No. 4,105,216, issued on Aug. 8, 1978, to Donald E. Graham et al, Japanese Patent First Publication No. 57-182544, published on Nov. 10, 1982, and British Patent First Publication No. 2,090,495, published on July 7, 1982 respectively disclose sensors for detecting road surface conditions or displacement of sprung and unsprung masses in the vehicle suspension system photo-electrically. The contents of these publications are hereby incorporated by reference for the sake of disclosure. Furthermore, Japanese Patent First Publication No. 59-42468, published on Mar. 9, 1984, discloses a procedure for recognizing irregularities in the road surface on the basis of a road sensor utilizing ultrasonic waves. The procedure disclosed in this Japanese Patent First Publication is also hereby incorporated by reference for the sake of disclosure.

In order to allow adjustment of the shock absorbing characteristics, the shock absorber 14 can be operated in any of three modes, namely HARD mode. SOFT mode and MEDIUM mode, in the last of which damping characteristics intermediate to those of HARD mode and SOFT mode are achieved.

The hydraulic shock absorber 14 has coaxial inner and outer cylinders 1402 and 1404 (see FIGS. 9-13). Top and bottom ends of the cylinders 1402 and 1404 are plugged with fittings 1406 is shown in the top of the cylinders, the fitting 1406 includes a seal 1407 which establishes a liquid-tight seal. A piston rod 1408 extends through an Opening 1412 formed in the fitting 1406 and is rigidly connected to a vehicle body (not shown) at its top end. The piston rod 1408 is, in turn, connected to a piston 1414 reciprocally housed within the inner cylinder 1402 and defining upper and lower fluid Chambers 1416 and 1418 therein.

The piston 1414 has fluid passages 1420 and 1422 connecting the upper and lower fluid chambers 1416 and 1418. The piston 1414 also has annular grooves 1424 and 1426 along its upper and lower surfaces concentric about its axis. The upper end of the fluid passage 1420 opens into the groove 1424. On the other hand, the lower end of the fluid passage opens into the grooves 1426. Upper and lower check valves 1428 and 1430 are provided opposite the grooves 1424 and 1426 respectively to close the grooves when in their closed positions. The lower end of the fluid passage 1420 opens onto the lower surface of the piston at a point outside of the check valve 1430. Likewise the upper end of the fluid passage 1422 opens onto the upper surface of the piston at a point outside of the check valve 1428.

Therefore, the fluid passage 1422 is active during the piston expansion stroke, i.e. during rebound of the shock absorber. At this time, the check valve 1428 prevents fluid flow through the fluid passage 1420. On the other hand, during the piston compression stroke, i.e. during bounding movement of the suspension, the fluid passage 1420 is active, allowing fluid flow from the lower fluid chamber 1418 to the upper fluid chamber 1416 and the fluid passage 1422 is blocked by the check valve 1430.

The piston rod 1408 has a hollow cylindrical shape so that a damping force adjusting mechanism, which will be referred to generally by the reference numeral "1500" hereafter, can be housed therein. The damping force adjusting mechanism 1500 includes a valve mechanism 1502 for adjusting the cross-sectional area through which the working fluid can flow between the upper and lower chambers. In the preferred embodiment, the valve mechanism 1502 allows three steps of variation of the damping force, i.e., HARD mode, MEDIUM mode and SOFT mode, the narrowest cross-sectional area representing the HARD mode, the widest the SOFT mode and intermediate the MEDIUM mode. The HARD mode actually represents two submodes, a normally stiff damping response in the compression stroke of the shock absorber and an extra-stiff response during expansion. Although the preferred embodiment of the invention will be described hereafter in terms of a three-way, adjustable-described damping-force shock absorber, the number of adjustable positions of the shock absorber may be increased or decreased as desired and is not limited to this example. However, the HARDest mode should exhibit different damping characteristics in expansion and compression.

Figure 9:
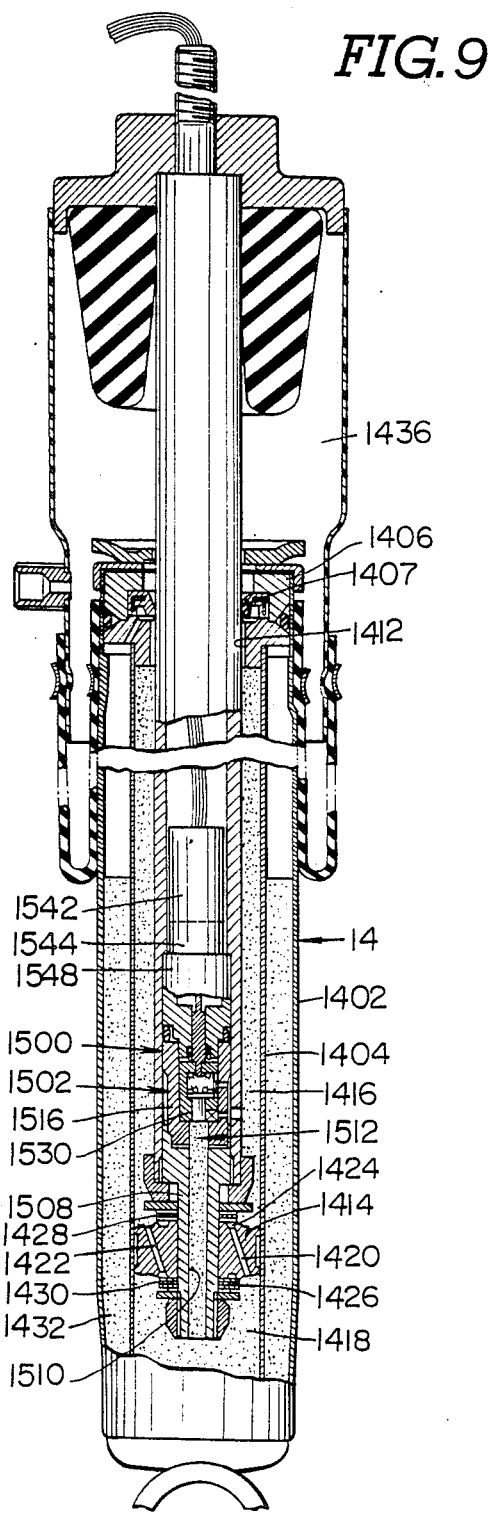
FIG. 9 is a longitudinal section through a shock absorber employed in the preferred embodiment of the suspension control system of FIG. 2.

As shown in FIG. 9, the piston rod 1408 defines an axially extending through opening 1504 with the lower end opening into the lower fluid chamber 1418. A fitting 1508 seals the lower end of the opening 1504 of the piston rod and has axially extending through opening 1510, the axis of which is parallel to the axis of the through opening 1504 of the piston rod. Thus, the through openings 1504 and 1510 constitute a fluid path 1512 extending through the piston rod. The piston rod 1408 also has one or more radially extending orifices or openings 1514 opening into the upper fluid chamber 1416. Thus, the upper and lower fluid chambers 1416 and 1418 are in communication through the fluid path 1512 and the radial orifices 1514.

A stationary valve member 1516 with a flaring upper end 1518 is inserted into the through opening 1504 of the piston rod. The outer periphery of the flaring end 1518 of the stationary valve member 1516 is in sealing contact with the internal periphery of the through opening. The stationary valve member 1516 has a portion 1520 with a smaller diameter than that of the upper end 1518 and so as to define an annular chamber 1522 in conjunction with the inner periphery of the through opening 1504 of the piston rod. The stationary valve member 1516 has two sets of radially extending orifices 1524 and 1526 and an internal space 1528. The radially extending orifices 1524 and 1526 establish communication between the internal space 1528 and the annular chamber 1522. A movable or rotary valve member 1530 is disposed within the internal space 1528 of the stationary valve member 1516. The outer periphery of the rotary valve member 1530 slidingly and sealingly contacts the inner surface of the stationary valve member 1516 to establish a liquid-tight seal therebetween. Radially extending orifices 1532 and 1534 are defined in the rotary valve member 1530 at positions opposite the orifices 1524 and 1526 of the stationary valve member 1516.

Figure 10:
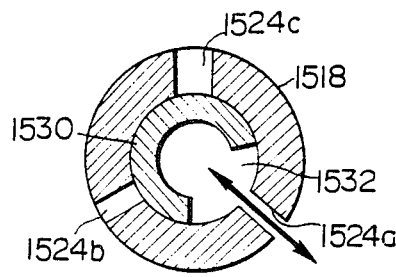
FIG. 10 is a cross-section taken along line X—X of FIG. 9.
Figure 11:
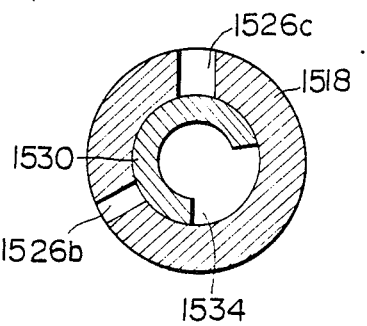
FIG. 11 is a cross-section taken along line XI—XI of FIG. 9.

As shown in FIGS. 10 and 11, the orifices 1524 and 1526 respectively include first, second and third orifices 1524a, 1524b, 1524c, and 1526b, and 1526c. The third orifices 1524c and 1526c have the largest cross-sections and the orifices 1532 and 1534 fall into alignment with the third orifices to allow easy fluid communication between the upper and lower fluid chambers 1416 and 1418 in the case of the SOFT mode. The second orifices 1524b and 1526b have somewhat smaller cross-sections and the orifices 1532 and 1534 are in alignment with the second orifices in the case of the MEDIUM mode. The cross-section of the first orifice 1524a is the smallest of all and is in register with the orifice 1532 in the case of the HARD mode.

A check valve 1536 is provided within an internal space of the rotary valve member 1530. The check valve 1536 is normally biased towards a valve seat 1538 by means of a bias spring 1540 allowing one-way fluid flow from the lower fluid chamber to the upper fluid chamber. This causes the compression damping force to be somewhat weaker than the expansion damping force.

Figure 13:
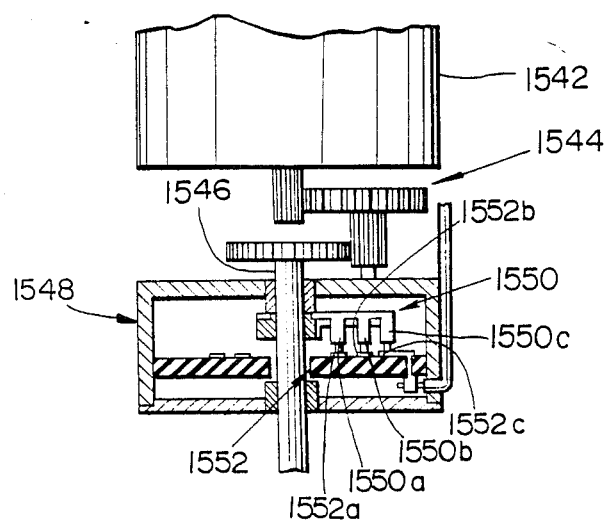

The rotary valve member 1530 is associated with an electrically operable actuator such as an electrical stepping motor 1542 through a differential gear unit 1544 and an output shaft 1546 as shown in FIG. 13. A potentiometer 1548 is associated with the output shaft 1546. The potentiometer 1548 includes a movable contact 1550 with contactors 1550a, 1550b and 1550c. The contactors 1550a, 1550b and 1550c are adapted to slidingly contact stationary contact elements 1552a, 1552b and 1552c of a stationary contact 1552. According to the electrical connections between the movable contact and the stationary contact, the potentiometer 1548 produces a mode signal representative of the rotary valve position and thus indicative of the selected mode of the damping force adjusting mechanism. The stepping motor 1542 is electrically connected to a controller 100 to receive the control signal as a mode selector signal which drives the motor 1542 through an angle corresponding to the rotary valve movement to the corresponding valve position. In this case, the potentiometer will return the mode signal as a feedback signal to indicate the instantaneous valve position.

It should be appreciated that the controller 100 may be operated either in automatic mode or in manual mode.

Returning to FIG. 9, the shock absorber has a fluid reservoir chamber 1432 between its inner and outer cylinders 1404 and 1402, which fluid reservoir chamber 1432 is in communication with the lower fluid chamber 1418 via the bottom fitting (not shown). The bottom fitting may serve to produce damping force in cooperation with the piston and the damping force adjusting mechanism during bounding and rebounding motion of the vehicle. A relatively low pressure pneumatic chamber 1436 is also defined between the inner and outer cylinders 1404 and 1402. The operation of the damping force adjusting mechanism 1500 will be briefly described herebelow with reference to FIGS. 10 and 11, in which the shock absorber is shown in the HARD mode. In this case, the orifice 1532 of the rotary valve 1530 is in alignment with the orifice 1524a and the orifice 1534 is not in alignment with either of the orifices 1526b or c. Thus as the vehicle bounds fluid flows from the lower chamber 1418 to the upper chamber 1416 via orifice 1524a and the valve passage 1420, and as the vehicle rebounds, fluid flows from the upper chamber 1416 to the lower chamber 1418 only via the valve passages 1422. Since the first orifice 1524a is the narrowest, the damping force produced in this mode is the highest among the three selectable modes.

In case of the MEDIUM mode, the orifices 1532 and 1534 of the rotary valve member 1530 are respectively in alignment with the second orifices 1524b and 1526b. During the piston compression stroke, the fluid flows from the lower fluid chamber 1418 to the upper fluid chamber 1416 through the orifices 1524b and 1526b. On the other hand, during vehicle rebounding motion, the fluid flows from the upper fluid chamber 1416 to the lower fluid chamber 1418 through orifice 1526b. At this time the fluid flow through the orifice 1524b is blocked by the check valve 1536.

In case of the SOFT mode, the orifices 1532 and 1534 align with the third orifices 1524c and 1526c, respectively to cause fluid flow. During the piston compression stroke, the fluid flows from the lower fluid chamber 1418 to the upper fluid chamber 1416 through the orifices 1524c and 1526c. On the other hand, during vehicle bounding motion, the fluid flows from the upper fluid chamber 1416 to the lower fluid chamber 1418 through orifice 1526c. At this time the fluid flow through the orifice 1524c is blocked by the check valve 1536.

Since the third orifices 1524c and 1526c are the widest of the three sets, as described above, the damping force created in this SOFT mode is the lowest.

In practical suspension control, the controller 100 performs control operations on the basis of the vehicle speed indicative signal Sv from the vehicle speed sensor 102, the steering angle indicative signal Sst from the steering angle sensor, the braking state indicative signal Sb from the brake switch 106 and the road condition indicative signal from the road sensor 108. The controller 100 executes suspension control programs including a main program governing execution of various routines which are adapted to be triggered in response to respectively corresponding trigger conditions.

Examples of the control operations performed by the controller 100 has been disclosed in European Patent First Publication No. 01 35 902, and the co-pending U.S. Pat. Applications Ser. Nos. 678,806, U.S. Pat. No. 4,652,010 647,648 now abandoned, 691,531 U.S. Pat. No. 4770,438 and 706,279, U.S. Pat. No. 4,600,215 respectively filed on Dec. 6, 1984, Sept. 6, 1984, Jan. 15, 1984 and Feb. 27, 1985. The contents of the above-identified U.S. Patents are hereby incorporated by reference for the sake of disclosure.

Figure 14:
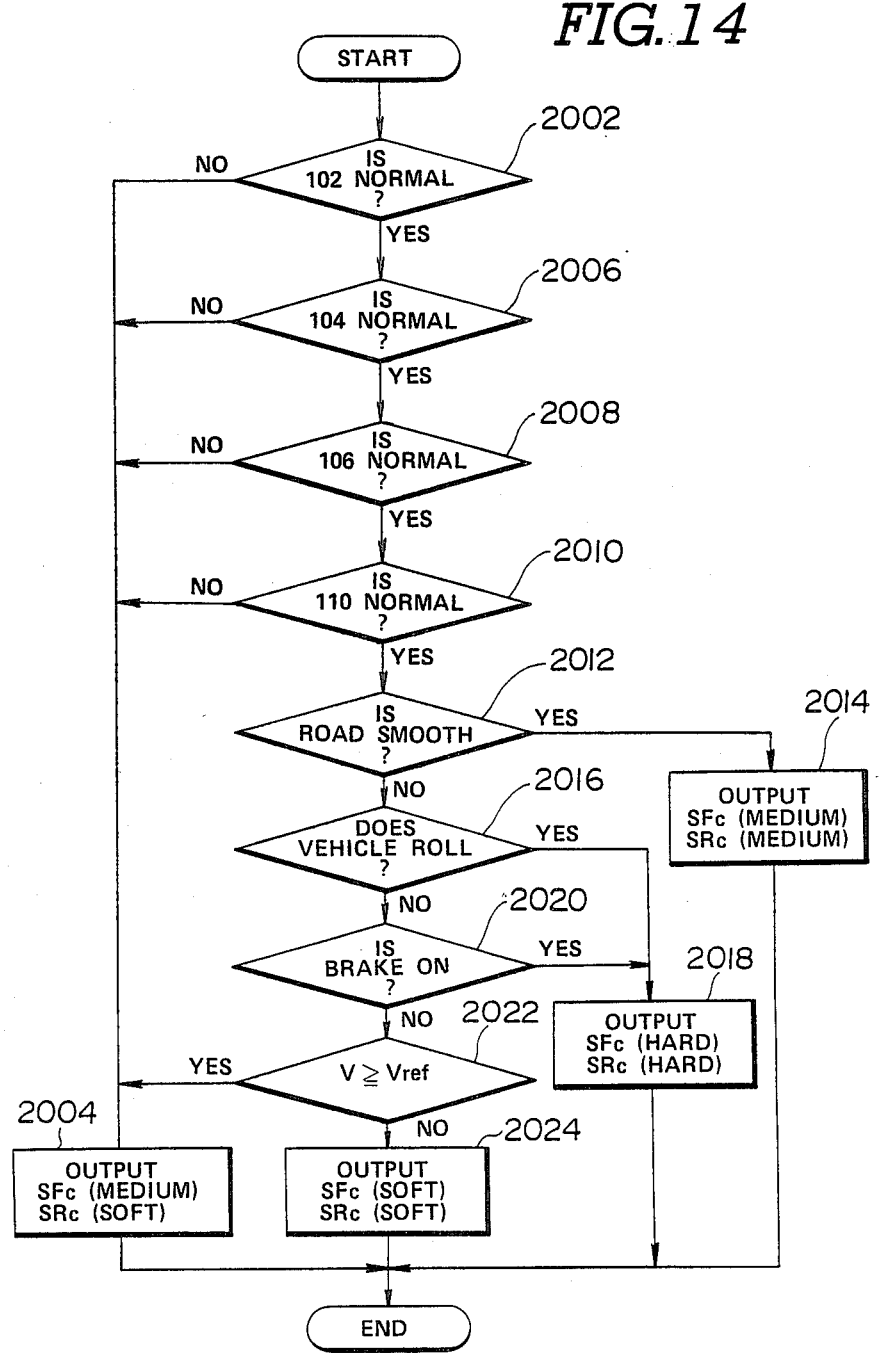
FIG. 14 is a flowchart of a fail-safe program which is executed periodically.

The controller 100 also performs a fail-safe operation by periodically executing a fail-safe program shown in FIG. 14. In the preferred embodiment, the suspension control program is executed every 20 msec. The suspension control program is illustrated in FIG. 14.

After starting execution of the fail-safe program, the vehicle speed sensor 102 is checked at a step 2002. In practice, in the step 2002, the program checks for fluctuations in the vehicle speed indicative signal value V over a predetermined period of time, e.g. 0 .1 sec. In order to perform this vehicle speed indicative signal value monitoring operation, the controller 100 is provided with a shift register 120 which has five memory cells 120-1, 120-2, 120-3, 120-4 and 120-5 (FIG. 2). The memory cell 120-1 is updated with a new value of the vehicle speed indicative signal each time the step 2002 is executed. The contents of the memory cell 120-1, 120-2, 120-3 and 120-4 are transferred to the respectively adjacent memory cells, at the same time the memory cell 120-1 is updated. At the same time, the memory cell 120-5 is cleared and loaded with the vehicle speed data stored in the memory cell 120-4. The contents of the memory cells 120-5 and 120-1 are compared to derive their difference. The difference thus derived is compared with a predetermined vehicle speed fluctuation threshold. If the difference is equal to or greater than the vehicle speed fluctuation threshold, the vehicle speed sensor 102 is recognized at the step 2002 to be malfunctioning. If malfunction of the vehicle speed sensor 102 is detected at the step 2002, the controller 100 derives front and rear suspension control signals SF$_c$, SR$_c$ ordering the shock absorbers 14 in the front suspension to MEDIUM mode and the shock absorbers 14 in the rear suspension to SOFT mode, at a step 2004.

On the other hand, if the difference between the vehicle speed data in the memory blocks 120-1 and 120-5 is smaller than the vehicle speed fluctuation threshold, then control passes to a step 2006. In the step 2006, the steering angle sensor is checked; specifically, the steering angle indicative signal SSt from the steering angle sensor 104 is monitored. As set out before, the steering angle sensor 104 produces a steering angle indicative signal pulse after each unit of steering angular variation. The controller 100 checks for receipt of a steering angle indicative pulse from the steering angle sensor over a period during which the vehicle can be presumed to cover a given distance. If no steering angle indicative pulses are received during that period, failure of the steering angle sensor 104 is recognized.

In order to monitor the steering angle sensor, the controller 100 derives a vehicle travelling distance value on the basis of the vehicle speed sensor signal Sv and clock pulses from a clock generator 122. Derivation of the vehicle travelling distance on the basis of the vehicle speed value V and the elapsed time is well known and does not need to be explained. As set out above, the controller 100 checks the interval between successive steering angle indicative pulses with respect to the vehicle travelling distance and recognizes failure of the steering angle sensor if the input interval between steering angle indicative pulses equals or exceeds a predetermined threshold. In such cases, control passes to the step 2004, in which the front shock absorbers 14 enter MEDIUM mode and the rear shock absorbers 14 enter SOFT mode.

If the input interval between steering angle indicative pulses is shorter than the predetermined threshold, then control passes to a step 2008 in which the brake switch is checked.

In the step 2008, the braking state indicative signal Sb is checked against the vehicle speed variation as indicated by the vehicle speed indicative signal. If the vehicle speed drops continuously, failure of the brake switch !06 is recognized if the braking state indicative signal is not continuously HIGH. It would also be possible to check the brake switch by checking the fluid pressure in the hydraulic brake system. For instance, if the fluid pressure in the brake system is equal to or greater than a given pressure threshold but the braking state indicative signal Sb remains LOW. failure of the brake switch 106 may be recognized.

If failure of the brake switch 106 is detected at the step 2008, control passes to the fail-safe step 2004 explained above.

If the brake switch 106 is operating normally, the road sensor 110 is checked at a step 2010. In order to check the operation of the road sensor 110, the road condition indicative signal value is monitored. If the road condition indicative signal has an abnormally large or small value, malfunction of the road sensor 110 is recognized. In practice, if the road condition indicative signal value is either zero or infinite, the road sensor 110 is judged to have failed.

If failure of the road sensor 110 is detected the step 2010, control passes to the step 2004, so that the front suspension is ordered to MEDIUM mode and the rear suspension to SOFT mode.

On the other hand, if the road sensor is operating normally, then normal state suspension control is performed on the basis of the road condition indicative signal, the brake state indicative signal, the steering angle indicative signal and the vehicle speed indicative signal.

In a step 2012, the road condition dependent control signal derivation is performed. In practice, road condition dependent suspension control routine selects damping characteristics for both front and rear shock absorbers 14 depending upon the smoothness of the road surface. If the road condition indicative signal value falls within a predetermined range, smooth road conditions are recognized. In this case, the front and rear suspension control signals ordering the front and rear shock absorbers into MEDIUM mode are output at a step 2014.

If the road condition indicative signal value lies outside of the predetermined range, the brake switch is checked at a step 2016. If the brakes are applied and thus the brake state indicative signal is HIGH, the front and rear suspension control signals ordering the front and rear shock absorbers to HARD mode are output at a step 2018.

If the brake state indicative signal Sb is LOW, then, at a step 2020, the steering angle indicative signal value is compared to a predetermined steering angle threshold. If the steering angle indicative signal value is equal to or greater than the steering angle threshold, the front and rear suspension control signals ordering the front and rear shock absorbers to HARD mode are output at the step 2018.

On the other hand if the steering angle indicative signal value is less than the steering angle threshold when checked at a step 2020, the vehicle speed indicative signal value V is compared to a vehicle speed threshold at a step 2022. If the vehicle speed indicative signal value is equal to or greater than the vehicle speed threshold Vref, then control passes to the step 2004 so as to operate the front shock absorber in MEDIUM mode and the rear shock absorber in SOFT mode.

On the other hand, if the vehicle speed indicative signal value V is less than the vehicle speed threshold Vref, the front and rear suspension control signals ordering the front and rear shock absorbers into SOFT mode are output at a step 2024.

While specific suspension control processes have been described hereabove with respect to the blocks 2010 to 2022, these should be appreciated as being mere examples and can be modified in any way necessary.

The controller 100 also perform a self-check by monitoring periodic signals periodically produced as long as the microprocessor serving as the controller is operating normally. In order to perform this self-monitoring operation, the controller 100 is provided with a watch-dog timer 130 (FIG. 2) which monitors the intervals between these periodic signals and outputs a reset signal when the interval exceeds a predetermined period. The watch-dog timer 130 is connected to a reset input terminal of the controller to perform an initial reset when controller malfunction is detected.

This Watch-dog timer 130 is well known to those skilled in the art and does not need to be explained in further detail. The failure-monitoring and initial resetting operation mentioned above is illustrated in U.S. Pat. No. 4,363,092, to Abo et al. The detailed description concerning the self-monitoring operation and initial-reset operation in the above-identified U.S. Patent is hereby incorporated by reference.

The front and rear suspension control signals are each supplied to the driver circuit 16 through digital-analog converter 17. Each driver circuit 16 is also connected to the potentiometer 1548 of the corresponding variable-damping-force shock absorber 14 to receive the mode signal as a feedback signal. The driver circuit 16 feeds a driving signal to the motor 1542 to drive the latter to turn the rotary valve member 1530 until the mode signal matches the corresponding control signal.

Each driver circuit 16 is also connected to receive an input from the watch-dog timer 130 to be reset in response to the reset signal when the controller 100 fails. In order to ensure driving stability when the controller fails, it would be better to set the driver circuits 16 for the front and rear shock absorbers 14 to operate the front shock absorber to MEDIUM mode and the rear shock absorber to SOFT mode when the driver circuit 16 is reset.

It should be noted that the foregoing fail-safe operation for the suspension control system according to the invention is particularly adapted to the suspension control systems for front-wheel drive vehicles. Therefore, during fail-safe operation, by setting the front shock absorber to MEDIUM mode and the rear shock absorber to SOFT mode, under-steering characteristics can be ensured for driving stability. However, the fail-safe system according to the present invention is, of course, applicable for the suspension control system of any type of vehicle. In cases where the fail-safe system is applied to the suspension control system for some other type of the vehicle, such as a rear-wheel drive vehicle, shock absorber mode selection may be somewhat different from that set forth above. The essential consideration for the shock absorber mode selection is to ensure prevention of over-steering when one of the components of the control system fails.

It should also be appreciated that although the shown embodiment has been directed to a suspension control system including a the vehicle speed sensor, a steering angle sensor, a brake switch and a road sensor for vehicle speed dependent control, rolling magnitude dependent control, anti-dive control and road condition dependent control, suspension control is not limited to those specified parameters.

Figure 15:
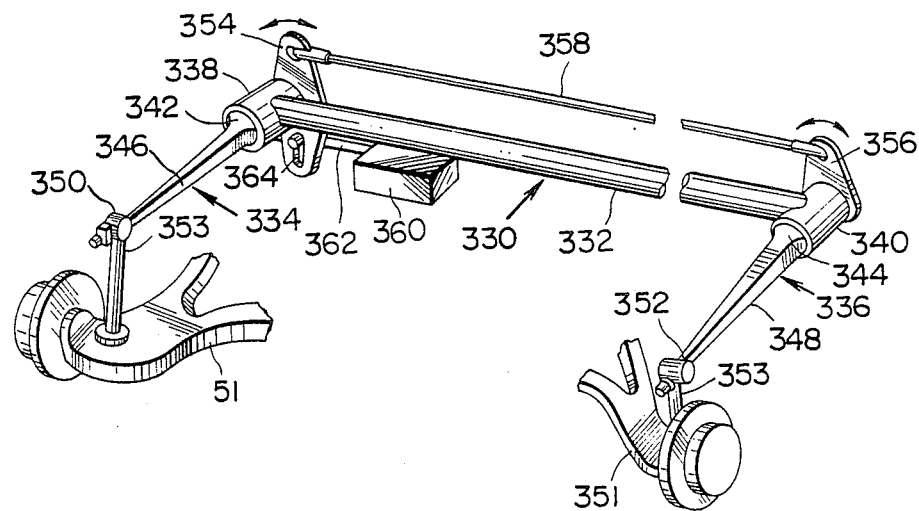
FIG. 15 is a perspective view of a stabilizer with a variable torsional modulus for suppressing rolling motion of the vehicle, which stabilizer is the second embodiment of the present invention.
Figure 16:
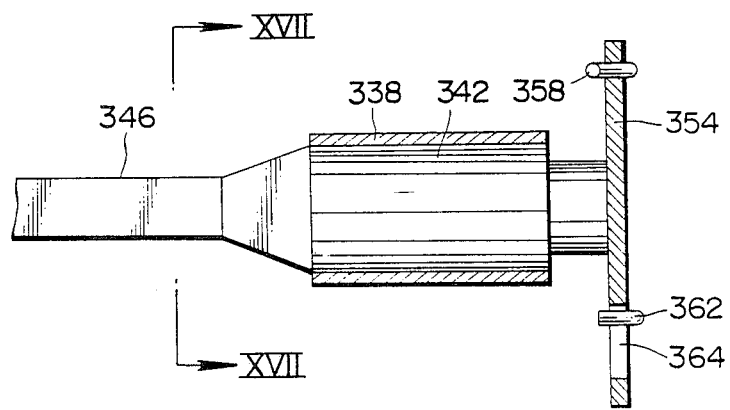
FIG. 16 is an enlarged section of a major part of the roll-stabilizer of FIG. 15.
Figure 17:
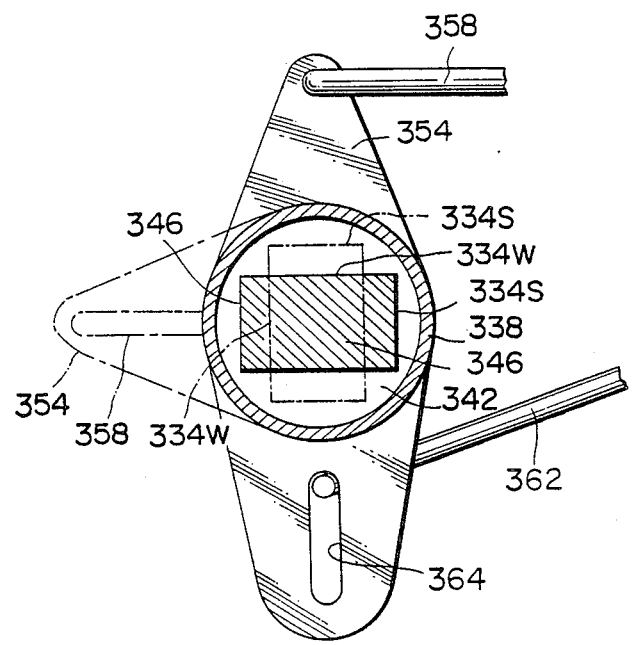
FIG. 17 is a cross-section taken along line XVII—XVII of FIG. 16.

FIGS. 15 to 17 show the structure of a roll stabilizer 300 to be utilized in the second embodiment. The roll stabilizer 300 comprises a transverse bar section 332 and a pair of parallel bar sections 334 and 336. The transverse bar section 332 extends essentially perpendicular to the vehicle axis and has a circular cross-section. The transverse bar section 332 is connected to hollow cylindrical bearing sections 338 and 340 at both ends. The parallel bar sections 334 and 336 have end segments 342 and 344 of circular cross-section adapted to rotatably engage the bearings 338 and 340 of the transverse bar section 332. The parallel bar sections 334 and 336 also have rectangular cross-section major sections 346 and 348, each of which has one end 350 and 352 connected to a suspension arm 351 through a connecting rod 353 which allows free rotation of the associated bar 334 or 336.

The cylindrical cross-section end segments 342 and 344 of the parallel bar sections 334 and 336 extend beyond the ends of the bearing portions 338 and 340. Link plates 354 and 356 are rigidly fitted onto the protruding ends of the parallel bar sections 334 and 336.

The link plates 354 and 356 are rotatable about the bearing sections 338 and 340 together with the parallel bar sections 334 and 336. The link plates are connected to each other through a linkage 358. In addition, the link plate 354 is associated with an actuator 360 through an actuation rod 362 engaging an elongated opening 364 of the link plate 354. The actuator 360 may comprise an electromagnetically operative solenoid. The actuator is adapted to be energized by a control signal fed from a controller 100 to rotate the link plate, 354 along with the parallel bar section 334 through 90° from the shown neutral position. When the actuator 360 is energized, the link plate 356 is also rotated according to rotation of the link plate 354 to pivot the parallel bar 336 through 90° within the bearing section 340.

As shown in FIG. 17, at the neutral position, the parallel bar sections 334 and 336 lie with their wider sides 334w (336w) horizontal. In this position, since the resistance of the parallel bar sections 334 and 336 to the vertical bending moment applied when the vehicle wheel bounds or rebounds is relatively small, the torsion on the transverse bar section 332 of the stabilizer 300 is small. When the actuator 360 is energized, the parallel bar sections 334 and 336 are rotated to lie with their shorter sides 334s (336s) horizontal, as shown in phantom line in FIG. 17. In this position, the bending stress on the parallel bar sections 334 and 336 is increased, i.e., the torsion on the transverse bar section 332 of the stabilizer is increase.

In this embodiment, the roll-stabilizer 300 is normally arranged so that the wider sides 334W and 336W of the parallel bar sections 334 and 336 lie horizontal.

As set forth above, since the resistance of the parallel bar sections 334 and 336 to bounding and rebounding of the vehicle wheel is relatively weak in this position, the stiffness of the suspension remains low to provide good riding comfort. This roll-stabilizer 300 is held in this position as long as the steering angle change within each calculation period derived on the basis of the vehicle speed remains less than the threshold value which is also derived in accordance with the vehicle speed.

When the steering angle change matches or exceeds the threshold value, the actuator 360 is energized to rotate the parallel bar sections 334 and 336 through 90° to align the shorter sides 334S and 336S horizontally. As a result, a greater resistance is exerted against bounding and rebounding of the vehicle wheel to successfully suppress rolling motion of the vehicle body.

Therefore, controlling the stiffness of the roll-stabilizer set forth above can also achieve roll-suppressive suspension control comparable to that of the first embodiment.

In this second embodiment, the same fail-safe operation illustrated with respect to the first embodiment can be performed by the controller. In the fail-safe operation for the second embodiment, the front stabilizer may be held stiffer than the rear stabilizer.

Figure 18:
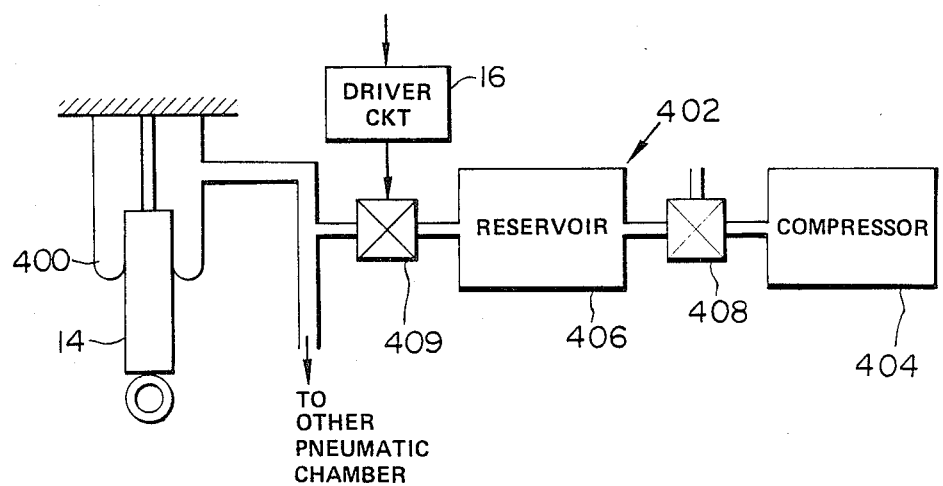
FIG. 18 is a schematic diagram of the third embodiment of a suspension control system according to the present invention.

FIG. 18 shows another arrangement of the automotive suspension system to which the control system according to the present invention is applicable. In the shown system, an expandable and contractable pneumatic chamber 400 is formed above the shock absorber 14. The pneumatic chamber 400 is connected to a pressurized pneumatic fluid source 402. The fluid source 403 comprises a compressor 404 for pressurizing a fluid such as air, a reservoir tank 406 connected to the compressor 404 through an induction valve 408, and a pressure control valve 409. The pressure control valve 409 is connected to the driver circuit 16 to be controlled thereby. In the induction mode, the fluid reservoir 406 is connected to the compressor 402 to receive the pressurized fluid. On the other hand, the fluid reservoir 406 is open to atmosphere to decrease the fluid pressure in the ventilation mode of the induction valve.

The pressure control valve 409 is co-operative with the induction valve 409 to adjust the fluid pressure in the pneumatic chamber 400 in accordance with vehicle driving conditions.

According to the shown embodiment, the driver circuit 16 may be connected to the control system of the first embodiment so that it is activated in response to steering behavior. When energized by the driver circuit, the pressure control valve 409 closes to block pneumatic fluid communication between the pneumatic chamber 400 and the fluid reservoir 406. As a result, the effective volume of the pneumatic chamber 400 corresponds to that of the pneumatic chamber. Since the damping characteristics due to the pneumatic pressure in the pneumatic chamber is related to the effective volume of the pneumatic chamber and a smaller volume is achieved by blocking fluid communication between the pneumatic chamber and the fluid reservoir, the pneumatic chamber becomes relatively rigid in this case, providing a larger damping force in response to the steering behavior which causes rolling on the vehicle.

On the other hand, in the normal valve position, the pressure control valve 409 opens to establish fluid communication between the pneumatic chamber and the fluid reservoir. As a result, the effective volume becomes equal to the sum of the volumes of the pneumatic chamber and the fluid reservoir. By providing a larger effective volume, damping characteristics of the pneumatic chamber are weakened.

Figure 12:
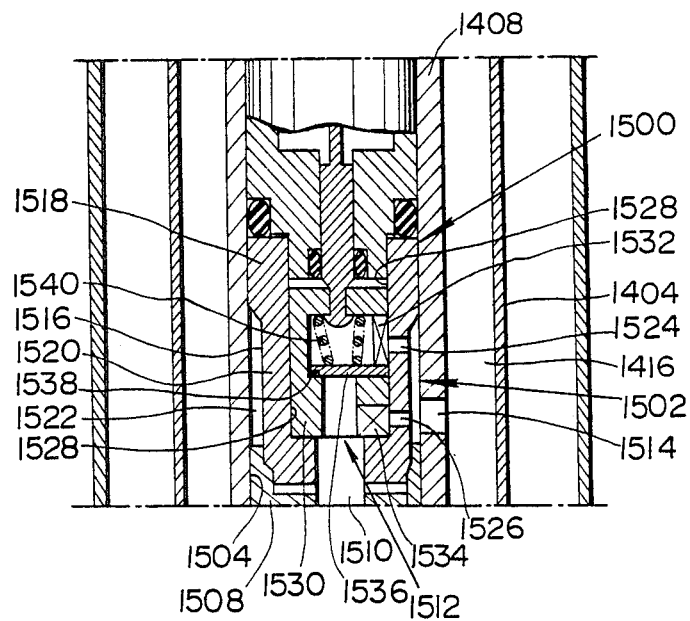
FIGS. 12 and 13 are enlarged longitudinal sections through a damping force adjusting mechanism in the shock absorber of FIG. 9.

The above-mentioned suspension system structure of FIG. 12 has been disclosed in U.S. Pat. No. 4,349,077 to Sekiguchi et al and U.S. Pat. No. 4,327,936 to Sekiguchi. In addition, a similar system has been disclosed in the co-pending U.S. Pat. Application Ser. No. 573,504, U.S. Pat. No. 4,647,069, filed on Jan. 24, 1984, which corresponds to the Co-pending European Patent Application No. 84100729.7, filed on Jan. 24, 1984.

The contents of the above-identified U.S. Patents are hereby incorporated by reference.

In this third embodiment, the fail-safe operation is performed by increasing the pneumatic pressure in the pneumatic chambers of the front suspensions relative to that in the pneumatic chambers of the rear suspension systems.

Again, in the shown embodiments, the fail-safe operation is designed for use with the front-wheel drive vehicles, similar fail-safe operations may be applied to rear-wheel drive vehicles or four-wheel drive vehicles. In such cases, the mode selection of the front and rear suspension system will be somewhat different from that illustrated above. The principle of the fail-safe operation is to suppress over-steering characteristics. Therefore, mode selection should be performed so as to satisfy this essential requirement.

According to the invention as set forth above, all of the objects and advantages sought therefor can be fulfilled.

What is claimed is:

1. A suspension control system comprising:
    front and rear vehicle suspension systems, each being operable to assume various mode positions producing different damping characteristics;
    a sensor for detecting a preselected vehicle driving condition and producing a sensor signal indicative thereof;
    a controller responsive to said sensor signal for deriving independent front and rear suspension control signals indicative of one of said mode positions and outputting said control signals to said front and rear suspension systems to order said front and rear suspension systems to assume the indicated mode position, said controller checking its own operation and that of said sensor to determine a malfunction and performing a fail-safe control operation in which said controller orders one of said front and rear suspension systems to assume a stiffer-damping-characteristics mode position relative to the other regardless of the output of said sensor in order to increase under-steering characteristics when said malfunction of one of said controller and said sensor is detected.

2. The suspension control system as set forth in claim 1, wherein each of said front and rear suspension systems incorporates a shock absorber which exhibits different damping characteristics depending upon the selected mode position.

3. The suspension control system as set forth in claim 2, wherein said shock absorber is operable to assume one of a HARD mode where the stiffest damping characteristics are obtained, a SOFT mode where the weakest damping characteristics are obtained and a MEDIUM mode where damping characteristics intermediate the damping characteristics obtained in said HARD mode and SOFT mode are obtained.

4. The suspension control system as set forth in claim 3, wherein said controller orders said shock absorber in said front suspension to assume said MEDIUM mode position and said shock absorber in said rear suspension system to assume said SOFT mode position during said fail-safe operation.

5. The suspension control system as set forth in claim 1, wherein each of said front and rear suspension systems includes a stabilizer with variable damping characteristics wherein said stabilizer acts against a vehicular rolling moment, and said controller orders said stabilizer in said one of front and rear suspension systems to assume a stiffer-damping-characteristics mode position relative to the other during fail-safe operation.

6. The suspension control system as set forth in claim 1, wherein each of said front and rear suspension systems includes a pneumatic spring means with variable damping characteristics realized by adjusting pneumatic pressure in said pneumatic spring means, and said controller increases the pneumatic pressure in said pneumatic means in said one of front and rear suspension systems to a level higher than that of the other during said fail-safe operation.

7. The suspension control system as set forth in claim 1, wherein said sensor is a vehicle speed sensor for producing a vehicle speed indicative signal and said controller orders stiffer damping characteristics to be assumed by the front and rear suspension systems when the vehicle speed indicative signal value is higher than a predetermined vehicle speed threshold.

8. The suspension control system as set forth in claim 7, wherein said controller monitors variations of said vehicle speed indicative signal value over a predetermined period of time and detects failure of said vehicle speed sensor when the change in said vehicle speed sensor signal value over said predetermined period exceeds a given value.

9. The suspension control system as set forth in claim 1, wherein said sensor is a steering angle sensor monitoring steering adjustments and producing a pulsatile steering angle indicative signal indicative of given units of steering angular variation, and said controller performs roll-suppressive suspension control in accordance with said steering angle indicative signal.

10. The suspension control system as set forth in claim 9, wherein said controller monitors change of said steering angle indicative signal relative to a vehicle travelling distance and recognizes failure of said steering angle sensor if the steering angle signal is absent while the vehicle travels a predetermined distance.

11. The suspension control system as set forth in claim 1, wherein said sensor is a brake switch closed when vehicular brakes are applied and said controller performs pitching-suppressive suspension said brake switch is closed.

12. The suspension control system as set forth in claim 11, wherein said controller monitors vehicle speed as well as the position of said brake switch and recognizes failure of said brake switch when vehicle deceleration is detected but said brake switch is open.

13. The suspension control system as set forth in claim 1, wherein said sensor is a road sensor monitoring smoothness of the road surface and producing a road sensor signal indicative thereof, and said controller controls damping characteristics of said front and rear suspensions in accordance with said road sensor signal.

14. The suspension control system as set forth in claim 13, wherein said controller monitors said road sensor signal value and compares said value to a given range of values, and said controller recognizes failure of said road sensor when said road sensor signal value falls outside of said range.

15. The suspension control system as set forth in claim 1 wherein said one of said front and rear suspension systems ordered to assume a stiffer-damping-characteristics mode position during fail-safe operation is said front suspension system.

16. A suspension control system comprising:
front and rear vehicle suspension systems, each being operable to assume various mode positions producing different damping characteristics;
a sensor for detecting preselected vehicle driving conditions and producing a sensor signal indicative thereof;
a controller responsive to said sensor signal for deriving independent front and rear suspension control signals indicative of one of said mode positions and outputting said control signals to said front and rear syspension systems to order at least one of said front and rear suspension systems to assume the indicated mode position, said controller checking its own operation and that of said sensor for malfunction and performing a fail-safe operation in which one of said front and rear suspension systems is ordered to assume a stiffer-damping-characteristics mode position relative to the other regardless of the output of said sensor in order to increase tendency of under-steering characteristics when malfunction of one of said controller and said sensor is detected.

17. The suspension control system as set forth in claim 16, wherein each of said front and rear suspension systems incorporates a shock absorber which exhibits different damping characteristics depending upon the selected mode position.

18. The suspension control system as set forth in claim 17, wherein said shock absorber is operable in one of a HARD mode where the stiffest damping characteristics are obtained, a SOFT mode where the weakest damping characteristics are obtained and a MEDIUM mode where damping characteristics intermediate the damping characteristics obtained in said HARD mode and SOFT mode are obtained.

19. The suspension control system as set forth in claim 18, wherein said controller orders said shock absorber in said front suspension to said MEDIUM mode position and said shock absorber in said rear suspension system to said SOFT mode position during said fail-safe operation.

20. The suspension control system as set forth in claim 16, wherein each of said front and rear suspension systems includes a stabilizer with variable damping characteristics and which acts against vehicular rolling moment, and said controller orders said stabilizer in said one of front and rear suspension system to a stiffer-damping-characteristics mode position relative to the other during fail-safe operation.

21. The suspension control system as set forth in claim 16, wherein each of said front and rear suspension systems includes a pneumatic spring means with variable damping characteristics realized by adjusting pneumatic pressure, and said controller increases the pneumatic pressure in said pneumatic means in said one of front and rear suspension system to a level higher than that of the other during said fail-safe operation.

22. The suspension control system as set forth in claim 16, wherein said sensor is a vehicle speed sensor for producing a vehicle speed indicative signal and said controller orders stiffer damping characteristics for the front and rear suspension systems when the vehicle speed indicative signal value is higher than a predetermined vehicle speed threshold, and said controller monitors variation of said vehicle speed indicative signal value over a predetermined period of time and detect failure of said vehicle speed sensor when the change in said vehicle speed sensor signal value over said predetermined period exceeds a given value.

23. The suspension control system as set forth in claim 16, wherein said sensor is a steering angle sensor monitoring steering adjustments and producing a pulsatile steering angle indicative signal indicative of given units of steering angular variation, and said controller performs roll-suppressive suspension control in accordance with said steering angle indicative signal, and said controller monitors change of said steering angle indicative signal relative to a vehicle travelling distance and recognizes failure of said steering angle sensor if the steering angle signal is absent while the vehicle travels a predetermined distance.

24. The suspension control system as set forth in claim 16, wherein said sensor is a brake switch closed when vehicular brakes are applied and said controller performs pitching-suppressive suspension said brake switch is closed, and said controller monitors vehicle speed as well as the position of said brake switch and recognizes failure of said brake switch when vehicle deceleration is detected but said brake switch is open.

25. The suspension control system as set forth in claim 16, wherein said sensor is a road sensor monitoring smoothness of the road surface and producing a road sensor signal indicative thereof, and said controller controls damping characteristics of said front and rear suspensions in accordance with said road sensor signal, and said controller monitors said road sensor signal value and compares said value to a given range of values, and said controller recognizes failure of said road sensor when said road sensor signal value falls outside of said range.

26. The suspension control system as set forth in claim 16, wherein said one of said front and rear suspension systems ordered to assume a stiffer-damping-characteristics mode position during fail-safe operation is said front suspension system.

27. A system, comprising:
a vehicle;
a vehicle front suspension for supporting a front of said vehicle, said vehicle front suspension having various mode positions for producing different damping characteristics;
a vehicle rear suspension for supporting a rear of said vehicle, said vehicle rear suspension having various mode positions for producing different damping characteristics;
sensor means for detecting various driving conditions of said vehicle and outputting signals indicative of said driving conditions;
means for monitoring said sensor means to detect a malfunction of said sensor means, said monitoring means producing a first indication if said sensor means is operating properly and outputting a second indication if said sensor means is malfunctioning;
normal control means responsive to said monitoring means first indication for receiving said sensor means output signals and commanding said front and rear suspensions to assume predetermined mode positions in response to the driving conditions indicated by said sensor means signals; and
fail-safe control means responsive to said monitoring means second indication for commanding said front and rear suspensions to each assume a predetermined fail-safe mode position in which the vehicle increases tendency of under-steer characteristics regardless of the output signals of said sensor means.

28. A system as set forth in claim 27 wherein said fail-safe means comprises means for determining whether the output of said sensor means has changed by a predetermined amount within a predetermined time period.

29. A system as set forth in claim 27 wherein said fail-safe means comprises means for determining whether the output of said sensor means is within a predetermined permissible range.

30. A system as set forth in claim 27 wherein said fail-safe control means includes means for monitoring the operation of said normal control means to determine a malfunction of said normal control means and commanding the front and rear suspensions to assume said fail-safe mode positions in the event of a malfunction of said normal control means.

31. A system as set forth in claim 28 wherein said fail-safe control means includes means for monitoring the operation of said normal control means to determine a malfunction of said normal control means and commanding the front and rear suspensions to assume said fail-safe mode positions in the event of a malfunction of said normal control means.

32. A suspension control system comprising:
front and rear vehicle suspension systems, each being operable to assume mode positions variable between a first harder damping characteristic, a second softer damping characteristic and a third intermediate damping characteristic intermediate between said first and second damping characteristics;
sensor means for detecting a preselected vehicle driving condition and producing a sensor signal indicative thereof;
a controller responsive to said sensor signal for deriving independent front and rear suspension control signals indicative of one of said mode positions for operating said front and rear vehicle suspension systems of respective one of said first, second and third damping characteristics and outputting said control signals to said front and rear suspension systems to order said front and rear suspension systems to assume the indicate mode position, said controller checking its own operation and that of said sensor to determine a malfunction and performing a fail-safe control operation in which said controller orders said front suspension systems to assume one of said first and third damping characteristics which is stiffer-damping-characteristics ;mode position relative to the rear suspension systems regardless of the output of said sensor.

33. A suspension control system comprising:
front and rear vehicle suspension systems, each being operable in a plurality of mutually different mode positions, in which each of said front and rear suspension exhibits a first harder damping characteristic in a first suspension mode position, a second softer damping characteristic in a second suspension mode position, and a third intermediate damping characteristic in a third suspension mode position, which third intermediate damping characteristic is intermediate between said first and second damping characteristics;
sensor means for detecting a preselected vehicle driving condition and producing a sensor signal indicative thereof including a vehicular steering angular displacement;
a controller responsive to said sensor signal for deriving independent front and rear suspension control signals indicative of one of said mode positions for operating said front and rear vehicle suspension systems of respective one of said first, second and third mode positions, said controller deriving said control signals respectively ordering said first mode position of said front and rear suspension systems when said vehicle steering angular displacement is greater than a predetermined threshold value, and outputting said control signals to said front and rear suspension systems to order said front and rear suspension systems to assume the indicated mode position, said controller checking its own operation and that of said sensor to determine a malfunction and performing a fail-safe control operation in which said controller orders said front suspension systems to assume said third mode position and said rear suspension system to assume said second mode position regardless of the output of said sensor.

34. A suspension control system comprising:
front and rear vehicle suspension systems, each being operable in a plurality of mutually different mode positions, in which each of said front and rear suspension exhibits a first harder damping characteristic in a first suspension mode position, a second softer damping characteristic in a second suspension mode position, and a third intermediate damping characteristic in a third suspension mode position, which third intermediate damping characteristic is intermediate between said first and second damping characteristics;

sensor means for detecting a preselected vehicle driving condition and producing a sensor signal indicative thereof including a vehicular steering angular displacement;

a controller responsive to said sensor signal for deriving independent front and rear suspension control signals indicative of one of said mode positions for operating said front and rear vehicle suspension systems of respective one of said first, second and third mode positions, said controller normally driving said control signal ordering said second mode positions for respective front and rear suspension systems, deriving said control signals respectively ordering said first mode position of said front and rear suspension systems when said vehicle speed is higher than a predetermined vehicle speed threshold, and outputting said control signals to said front and rear suspension systems to order said front and rear suspension systems to assume the indicated mode position, said controller checking its own operation and that of said sensor to determine a malfunction and performing a fail-safe control operation in which said controller orders said front suspension systems to assume said third mode position and said rear suspension system to assume said second mode position regardless of the output of said sensor.

35. A suspension control system comprising:

front and rear vehicle suspension systems, each being operable in a plurality of mutually different mode positions, in which each of said front and rear suspension exhibits a first harder damping characteristic in a first suspension mode position, a second softer damping characteristic in a second suspension mode position, and a third intermediate damping characteristic in a third suspension mode position, which third intermediate damping characteristic is intermediate between said first and second damping characteristics;

sensor means for detecting a preselected vehicle driving condition and producing a sensor signal indicative thereof including a vehicular braking condition indicative signal;

a controller responsive to said sensor signal for deriving independent front and rear suspension control signals indicative of one of said mode positions for operating said front and rear vehicle suspension systems of respective one of said first, second and third mode positions, said controller normally deriving said control signal ordering said second mode positions for respective front and rear suspension systems, deriving said control signals respectively ordering said first mode position of said front and rear suspension systems in response to said vehicular braking condition indicative signal, and outputting said control signals to said front and rear suspension systems to order said front and rear suspension systems to assume the indicated mode position, said controller checking its own operation and that of said sensor to determine a malfunction and performing a fail-safe control operation in which said controller orders said front suspension systems to assume said third mode position and said rear suspension system to assume said second mode position regardless of the output of said sensor.

36. A suspension control system comprising:

front and rear vehicle suspension systems, each being operable to assume mode positions variable between a first harder damping characteristic, a second softer damping characteristic and a third intermediate damping characteristic intermediate between said first and second damping characteristics;

sensor means for detecting a preselected vehicle driving condition and producing a sensor signal indicative thereof, said sensor means including a vehicle speed sensor for producing a vehicle speed indicative sensor signal;

a controller responsive to said sensor signal for deriving independent front and rear suspension control signals indicative of one of said mode positions for operating said front and rear vehicle suspension systems of respective one of said first, second and third damping characteristics and outputting said control signals to said front and rear suspension systems to order said front and rear suspension systems to assume the indicated mode position, said controller checking its own operation and that of said sensor to determine a malfunction, in which said controller derives a fluctuation of said vehicle speed indicative sensor signals over a predetermined period of time for detecting malfunction of said vehicle speed sensor when said fluctuation magnitude becomes greater than a given value, and performing a fail-safe control operation in which said controller orders said front suspension systems to assume one of said first and third damping characteristics which is stiffer-damping-characteristics mode position relative to the rear suspension systems regardless of the output of said sensor.

37. A suspension control system comprising:

front and rear vehicle suspension systems, each being operable to assume mode positions variable between a first harder damping characteristic, a second softer damping characteristic and a third intermediate damping characteristic intermediate between said first and second damping characteristics;

sensor means for detecting a preselected vehicle driving condition and producing a sensor signal indicative thereof, which sensor means including a steering angle sensor producing a vehicular steering angle indicative signal;

a controller responsive to said sensor signal for deriving independent front and rear suspension control signals indicative of one of said mode positions for operating said front and rear vehicle suspension systems or respective one of said first, second and third damping characteristics and outputting said control signals to said front and rear suspension systems to order said front and rear suspension systems to assume the indicated mode position, said controller checking its own operation and that of said sensor to determine a malfunction, in which said controller checks said steering angle sensor by monitoring variation of said steering angle indicative signal over a given period of time and detects malfunction of said steering angle sensor when said steering angle indicative signal value is maintained over said given period of time and performing a fail-safe control operation in which said controller orders said front suspension systems to assume one of said first and third damping characteristics which is stiffer-damping-characteristics mode position relative to the rear suspension systems regardless of the output of said sensor.

38. A suspension control system comprising:

front and rear vehicle suspension systems, each being operable to assume mode positions variable between a first harder damping characteristic, a second softer damping characteristic and a third intermediate damping characteristic intermediate between said first and second damping characteristics;

sensor means for detecting a preselected vehicle driving condition and producing a sensor signal indicative thereof, said sensor means including a vehicle speed sensor producing a vehicle speed indicative signal and a brake sensor producing a braking condition indicative signal:

a controller responsive to said sensor signal for deriving independent front and rear suspension control signals indicative of one of said mode positions for operating said front and rear vehicle suspension systems of respective one of said first, second and third damping characteristics and outputting said control signals to said front and rear suspension systems to order said front and rear suspension systems to assume the indicated mode position, said controller checking its own operation and that of said sensor to determine a malfunction, in which said controller monitors variation of said vehicle speed indicative signal and said braking condition indicative signal to detect malfunction of said brake sensor if said braking condition indicative signal is kept in absence while vehicular deceleration is detected for a given time, and performing a fail-safe control operation in which said controller orders said front suspension systems to assume one of said first and third damping characteristics which is stiffer-damping-characteristics mode position relative to the rear suspension systems regardless of the output of said sensor.

39. A suspension control system comprising:

front and rear vehicle suspension systems, each being operable to assume mode positions variable between a first harder damping characteristic, a second softer damping characteristic and a third intermediate damping characteristic intermediate between said first and second damping characteristics;

sensor means for detecting a preselected vehicle driving condition and producing a sensor signal indicative thereof, said sensor means including a vehicle height sensor for producing a vehicle height indicative signal:

a control responsive to said sensor signal for deriving independent front and rear suspension control signals indicative of one of said mode positions for operating said front and rear vehicle suspension systems of respective one of said first, second and third damping characteristics and outputting said control signals to said front and rear suspension systems to order said front and rear suspension systems to assume the indicated mode position, said controller checking its own operation and that of said sensor to determine a malfunction, in which said controller checks said vehicle height indicative signal for detecting malfunctioning of said vehicle height sensor when said vehicle height indicative signal maintains a value indicative of abnormally high or low vehicular height, and performing a fail-safe control operation in which said controller orders said front suspension systems to assume one of said first and third damping characteristics which is stiffer-damping-characteristics mode position relative to the rear suspension systems regardless of the output of said sensor.

* * * * *